A. C. WETHERBEE.
Shoemakers' Knife.
No. 168,818. Patented Oct. 11, 1875.
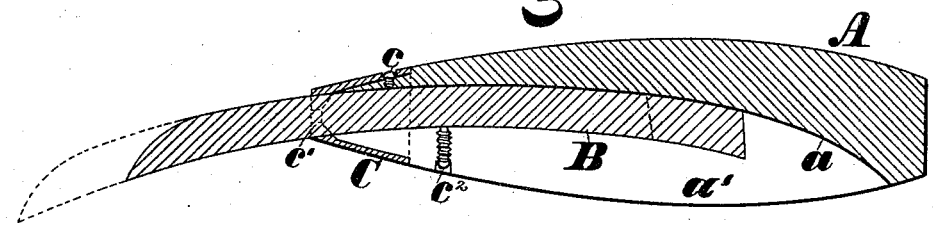
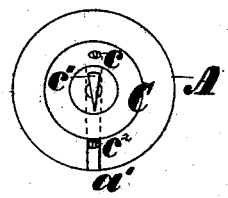

UNITED STATES PATENT OFFICE.

ALBERT C. WETHERBEE, OF HAMMONTON, NEW JERSEY.

IMPROVEMENT IN SHOEMAKERS' KNIVES.

Specification forming part of Letters Patent No. 168,818, dated October 11, 1875; application filed August 24, 1875.

*To all whom it may concern:*

Be it known that I, ALBERT C. WETHERBEE, of Hammonton, in the county of Atlantic and State of New Jersey, have invented certain new and useful Improvements in Cutting-Knives; and I do hereby declare the following to be a full, clear, and exact description of the invention, such as will enable others skilled in the art to which it pertains to make and use it, reference being had to the accompanying drawings which form a part of this specification, in which the figure is a side elevation of knife with handle in section.

The object of this invention is to retain the "hook" or curve of the blade of a cutting-knife until it is completely worn out, and relates more particularly to cutting leather for boots, shoes, harness, belting, &c., but may be used for other work to which it may be adapted.

The handle A, constructed of wood or other suitable material, is fitted with a slot or groove in its lower side, the depth of which is shown by the line $a$, to receive the blade B. The ferrule C is fitted with a set-screw, $c$, in its upper side near the large end, and a slot, $c^1$, in its small end to receive the blade. In the lower side of the handle, just back of the ferrule, is placed an adjustable screw, $c^2$, upon the inner end of which the blade is designed to rest. The blade B is curved its entire length, its inner or cutting edge being nearly the segment of a circle, and may be made any curve required by the work for which it is to be used.

The blade, being placed in the handle, with its inner or cutting edge resting in the slot $a'$ and upon the end of the screw $c^2$, is adjusted lengthwise as desired, and the set-screw $c$ set down upon the back edge, holding it firmly in its place.

Should more or less "hook" be desired, the set-screw $c$ is loosened, the screw $c^2$ turned in or out to the required point, and the blade fastened as before.

I am aware that cutting-knives have been used in which the blades were adjustable lengthwise; but such blades were straight. I am also aware that curved blades have been used, but not adjustable, being fixed firmly in the handles. I do not claim either of these.

I claim as my invention—

The combination of the slotted handle A, curved blade B, and blade-adjusting screws $c$ $c^2$, substantially as and for the purpose described.

In testimony that I claim the foregoing I have hereunto set my hand this 17th day of August, 1875.

ALBERT C. WETHERBEE.

Witnesses:
   THOS. S. WETHERBEE,
   H. S. WETHERBEE.